(12) United States Patent  
Fu et al.

(10) Patent No.: US 11,874,089 B1  
(45) Date of Patent: Jan. 16, 2024

(54) RANGEFINDER, SIGHTING APPARATUS AND SHOOTING AUXILIARY DEVICE

(71) Applicant: SHENZHEN RUIERXING ELECTRONIC CO., LTD., Guangdong (CN)

(72) Inventors: Luxin Fu, Guangdong (CN); Zhicheng Xing, Guangdong (CN)

(73) Assignee: SHENZHEN RUIERXING ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/211,601

(22) Filed: Jun. 20, 2023

(30) Foreign Application Priority Data

May 4, 2023 (CN) ............................ 20230493121.3

(51) Int. Cl.
```
F41G 1/473    (2006.01)
F41G 3/06     (2006.01)
G01S 17/08    (2006.01)
```

(52) U.S. Cl.
CPC ............. *F41G 1/473* (2013.01); *F41G 3/065* (2013.01); *G01S 17/08* (2013.01)

(58) Field of Classification Search
None
See application file for complete search history.

(56) References Cited

U.S. PATENT DOCUMENTS

| 2023/0044032 A1* | 2/2023 | Maryfield | ............... F41G 3/165 |
| 2023/0144958 A1* | 5/2023 | Fu | ........................... F41G 3/065 356/4.01 |

FOREIGN PATENT DOCUMENTS

WO   WO-2022021250 A1 *   2/2022   ............. F41G 1/473

* cited by examiner

*Primary Examiner* — Luke D Ratcliffe

(57) ABSTRACT

A rangefinder includes a housing detachably mounted and fixed on a sighting telescope; a power supply, a control module, a laser ranging module, a visible laser indicator, a display module and an optical visibility adjustment system which are accommodated in the housing, an optical path of laser ranging module is coaxial with an optical path of visible laser indicator, the visible laser indicator is used for a position indication when a ranging and aiming position of the laser ranging module coincides with a center of a reticle of the sighting telescope, an image shown by the display module is adjusted by the optical visibility adjustment system to meet observation habits of different users and make a ranging data visible in an eyepiece field of the sighting telescope, the image displayed by display module shows ranging and related information of the laser ranging module.

17 Claims, 9 Drawing Sheets

US 11,874,089 B1

RANGEFINDER, SIGHTING APPARATUS AND SHOOTING AUXILIARY DEVICE

CROSS-REFERENCE TO RELATED APPLICATIONS

The present application claims priority of Chinese Patent Application No. 202310493121.3, filed on May 4, 2023, the entire contents of which are hereby incorporated by reference.

TECHNICAL FIELD

The present application relates to the field of photoelectric technology, and particularly to a rangefinder, sighting apparatus and shooting auxiliary device.

DESCRIPTION OF THE PRIOR ART

A sighting telescope is used as an indispensable auxiliary tool for a shooting auxiliary device such as a bow, an arrow, a gun, etc., which can effectively help a user to improve shooting accuracy. However, a common sighting telescope estimates a distance of a target by means of scribe lines on a reticle of the sighting apparatus, which has great subjectivity and limitation, so that it is difficult to avoid errors. With the development of laser technology, laser ranging technology has been applied to sighting telescopes, which greatly improves accuracy and speed of ranging. However, a combination of a laser ranging module and a sighting telescope requires corresponding adjustment or modification of an optical path design and structure of an original sighting telescope, which is relatively costly.

SUMMARY OF THE DISCLOSURE

An object of the present application is to provide a rangefinder, sighting apparatus and shooting auxiliary device that can achieve ranging and observation without modifying and adjusting an original sighting telescope.

To achieve the above object, the technical solution adopted in the present application is:

In the first aspect, a rangefinder, comprising:
a housing detachably mounted and fixed on a sighting telescope;
a power supply, a control module, a laser ranging module, a visible laser indicator, a display module and an optical visibility adjustment system which are accommodated in the housing, wherein the power supply is electrically connected with the control module, the laser ranging module and the display module are electrically connected with the control module, an optical path of laser ranging module is coaxial with an optical path of visible laser indicator, the visible laser indicator is used for a position indication when a ranging and aiming position of the laser ranging module coincides with a center of a reticle of the sighting telescope, an image shown by the display module is adjusted by the optical visibility adjustment system to meet observation habits of different users and make a ranging data visible in an eyepiece field of the sighting telescope, the image displayed by display module shows ranging and related information of the laser ranging module.

In the second aspect, A sighting apparatus comprising a sighting telescope and the above rangefinder connected with the sighting telescope.

In the third aspect, A shooting auxiliary device comprising the above sighting apparatus Compared with the prior art, the advantageous effects of the rangefinder provided by the present application are that: the rangefinder provided by the present application is mounted on a sighting telescope, and a user can use the sighting telescope normally according to original usage habits, and can directly observe a range data in an eyepiece field of the original sighting telescope without modifying and adjusting an original sighting telescope, which is simple and convenient to use and cost saving.

BRIEF DESCRIPTION OF DRAWINGS

In order to provide a clearer explanation of the technical solution in the embodiments of the present application, a brief introduction will be given to the accompanying drawings required in the embodiments or technical descriptions in the prior art. It is evident that the accompanying drawings in the following description are only some embodiments of the present application. For those skilled in the art, other accompanying drawings can be obtained based on these drawings without any creative labor.

DESCRIPTION OF EMBODIMENTS

In order to make the technical problems, solutions, and beneficial effects to be solved in the present application clearer, the following is a further detailed explanation of the present application in conjunction with the accompanying drawings and embodiments. It should be understood that the specific embodiments described here are only used to explain the present application and are not intended to limit it.

It should be noted that when a component is referred to as "fixed to" or "set to" other component, it can be directly or indirectly on the other component. When a component is referred to as "connected to" other component, it can be directly or indirectly connected to the other component.

It should be understood that the terms "length", "width", "up", "down", "front", "back", "left", "right", "vertical", "horizontal", "top", "bottom", "inside", "outside", and other indications of orientation or positional relationships are based on the orientation or positional relationships shown in the accompanying drawings, and are only for the convenience of describing the present application and simplifying the description, rather than indicating or implying that a device or component referred to must have a specific orientation, be constructed and operated in a specific orientation, it cannot be understood as a limitation of the present application.

In addition, the description of "first," "second," etc. in the present application is used for descriptive purpose only and is not to be understood as indicating or imply their relative importance or implicitly indicate the number of indicated technical features. Thus, features defined with "first," "second" may explicitly or implicitly include at least one such feature. In the description of the present application, "multiple" means two or more, unless otherwise specified.

Figure 1:
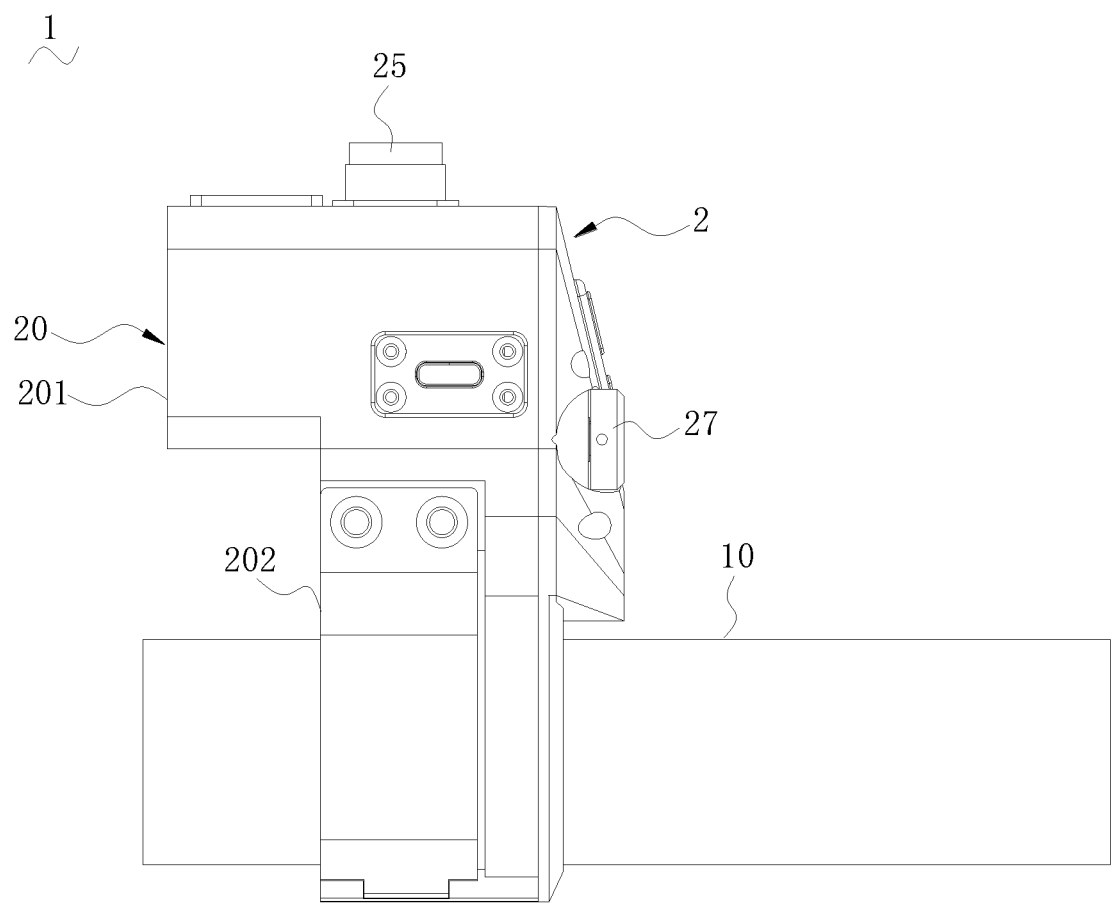
FIG. 1 is a schematic structural view of an embodiment of an sighting apparatus according to the present application.
Figure 2:
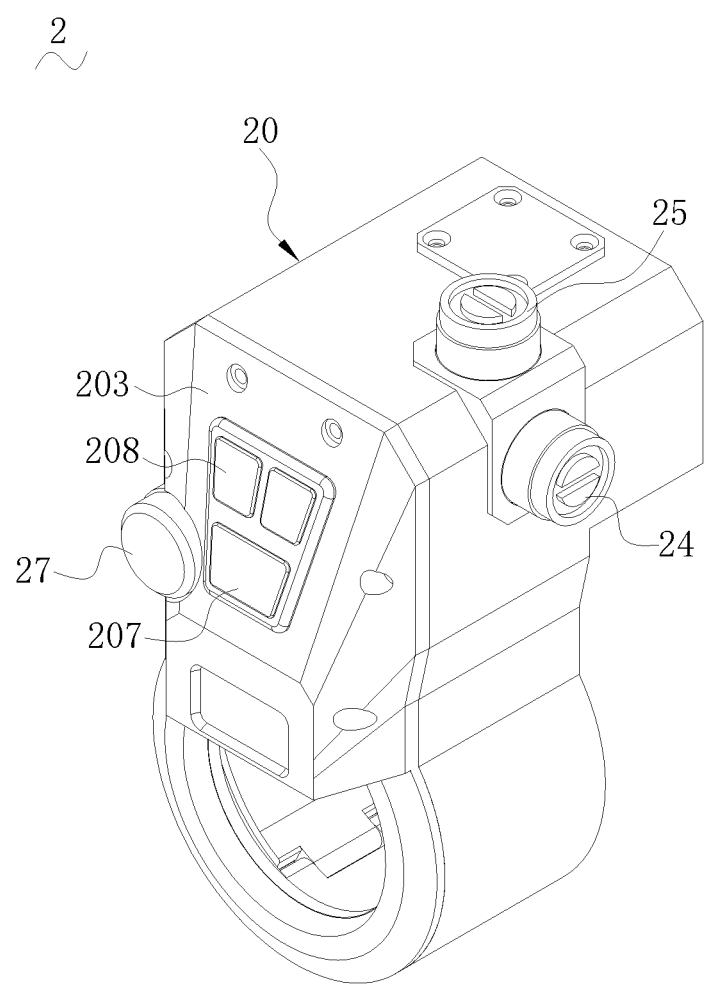
FIG. 2 is a perspective view of a rangefinder of the sighting apparatus shown in FIG. 1.
Figure 3:
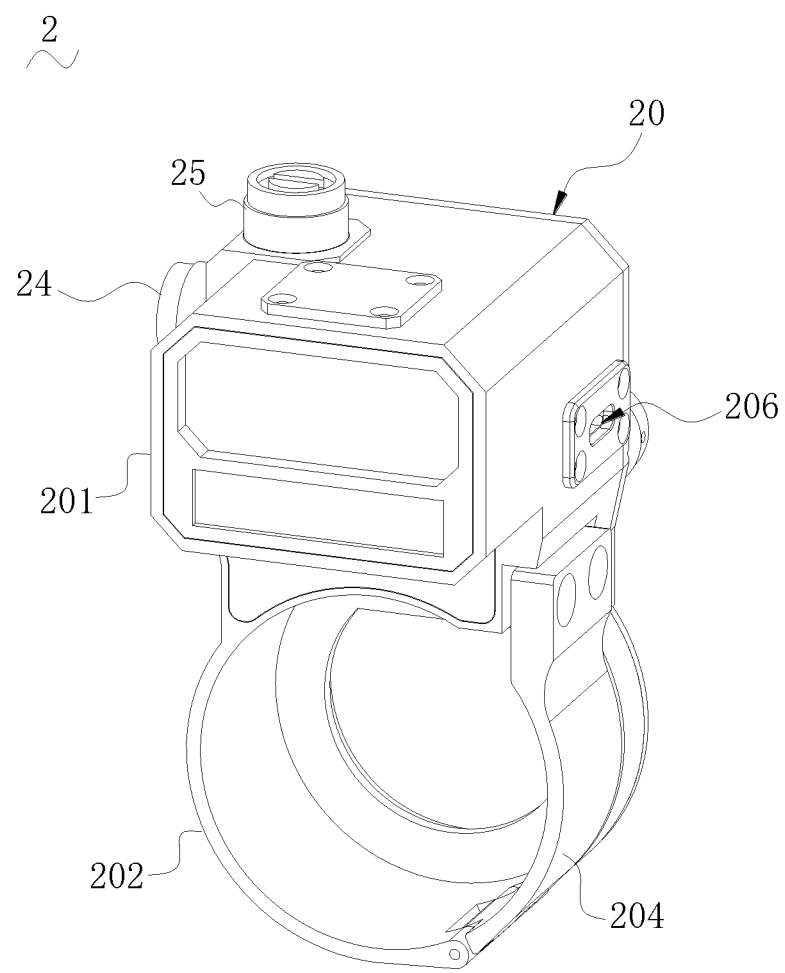
FIG. 3 is a perspective view of another viewing angle of the rangefinder shown in FIG. 2.
Figure 4:
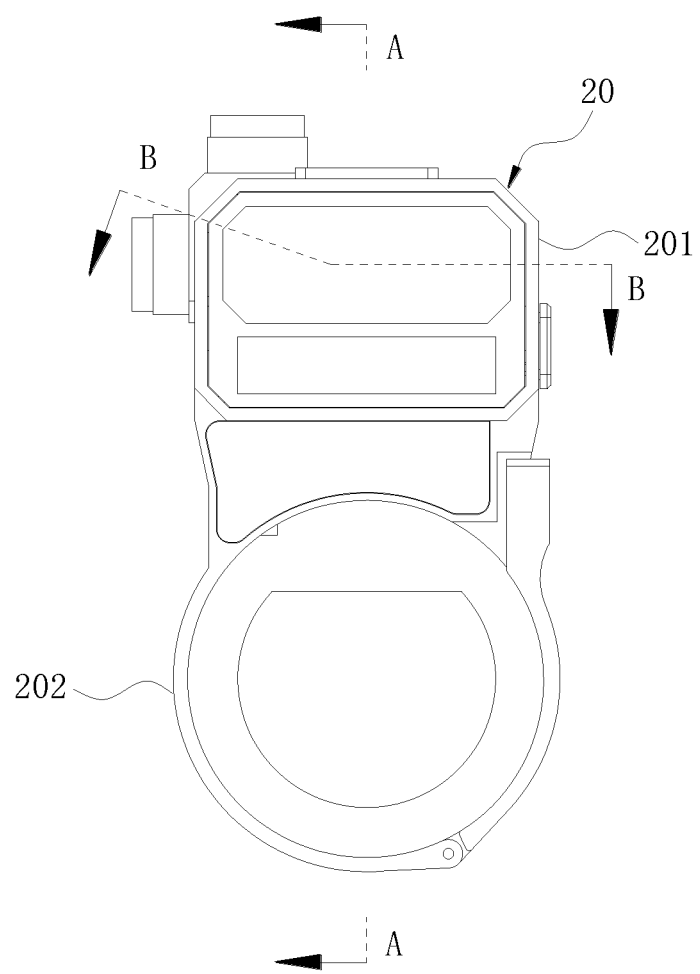
FIG. 4 is a side view of the rangefinder shown in FIG. 2.

Referring to FIGS. 1 to 4, FIG. 1 shows a sighting apparatus 1 provided by an embodiment of the present application, which is detachably equipped with a rangefinder 2 on a sighting telescope 10, and FIGS. 2 to 4 show the structure of each angle of the rangefinder. Further referring to FIGS. 5 to 7, the rangefinder 2 includes a housing 20, a power supply 21, a control module 22, a laser ranging module 30, a visible laser indicator 32, a display module 40 and an optical visibility adjustment system 50 which are accommodated in the housing 20. The housing 20 is detachably mounted and fixed on the sighting telescope 10. In the embodiment, the sighting telescope 10 is provided with an eyepiece 11 and a reticle 12 arranged in a front side of the eyepiece 11. The housing 20 of the rangefinder 2 is mounted on an eyepiece tube of the Sighting telescope 10, the power supply 21 and the control module 22 are both fixed on one side inside the housing and the display module 40 is fixed near a rear side inside the housing 20.

The laser ranging module 30, the display module 40, and the power supply 21 are all electrically connected with the control module 22. An optical path of laser ranging module 30 is coaxial with an optical path of visible laser indicator 32. The visible laser indicator 32 is used for a position indication when a ranging and aiming position of the laser ranging module 30 coincides with a center of the reticle 12 of the sighting telescope 10. An image shown by the display module 40 is adjusted by the optical visibility adjustment system 50 to meet observation habits of different users. The image shown by the display module 40 can make a ranging data visible in an eyepiece field of the sighting telescope 10 through the optical visibility adjustment system 50. The image displayed by display module 40 shows ranging and related information of the laser ranging module 30. Specifically, the optical visibility adjustment system 50 adjusts a direction of light path emitted by the display module 40, the optical visibility adjustment system 50 is used to fold and reflect the image shown by the display module 40 into the eyepiece field of the sighting telescope 10, so that the image shown by the display module 40 can be seen in the eyepiece field of the sighting telescope 10. At the same time, the optical visibility adjustment system 50 also has visibility adjustment function. Through the adjustment of the optical visibility adjustment system 50 for the visibility, the rangefinder can adapt to visibility of different users. That is, the light emitted by the display module 40 is refracted and deflected through the optical visibility adjustment system 50, so that the optical path is projected into an user's eye, and in the eyepiece field of the sighting telescope 10, the user can observe the image of a target obtained by the sighting telescope 10 and the ranging image and ranging information of the target obtained by the rangefinder 2, without redesigning or modifying the structure and optical path of the original sighting telescope 10, which is cost saving; the setting of the optical visibility adjustment system 50 enables the rangefinder to adapt to the observation habits of different users. Regardless of whether the user's eyes are nearsighted or farsighted, and they are accustomed to being far or near the eyepiece, the image displayed by the display module 40 can be clearly observed through the adjustment of the optical visibility adjustment system 50.

Compared with the prior art, the rangefinder 2 provided in the present application is mounted on the sighting telescope 10, and the user can use the sighting telescope 10 normally according to the original usage habits, and can directly observe the ranging data in the eyepiece field of the original sighting telescope 10, without any modification and adjustment of the original sighting telescope 10, which is simple and convenient to use and cost saving.

Figure 5:
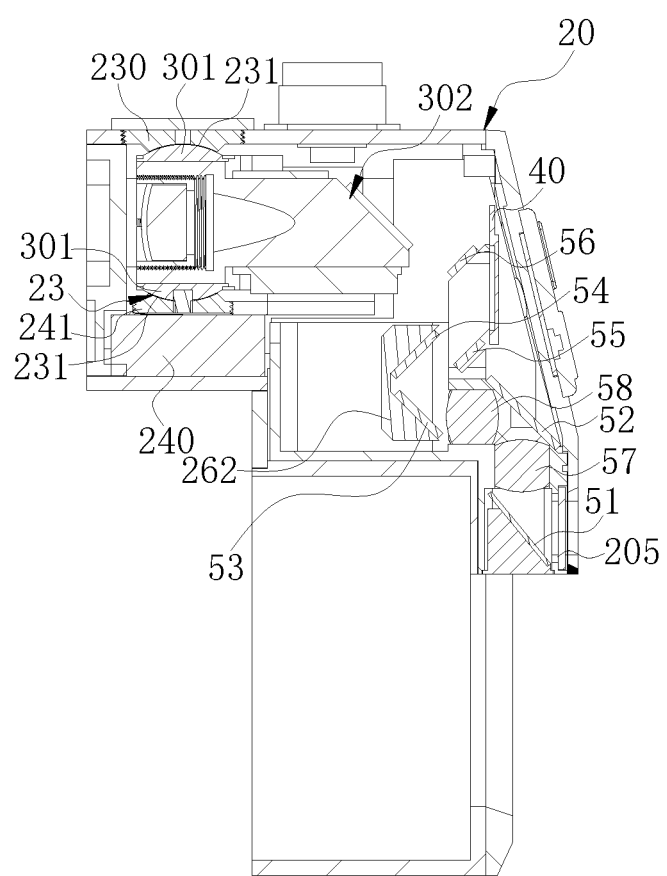
FIG. 5 is a cross-sectional view along line AA in FIG. 4.
Figure 6:
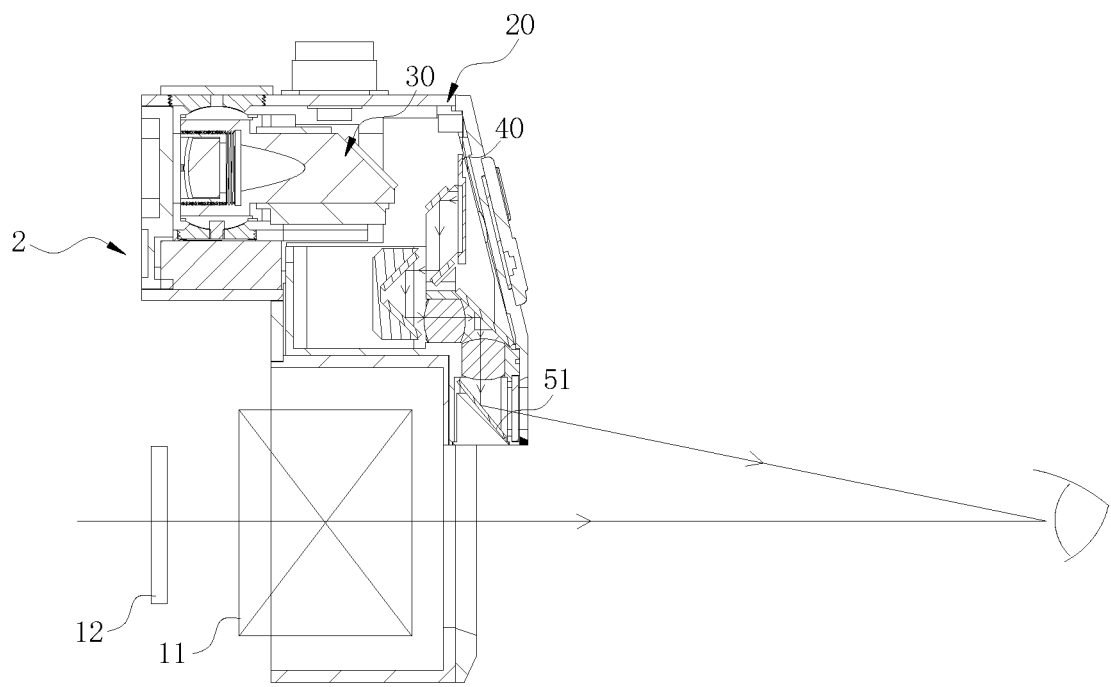
FIG. 6 is a schematic view of an optical path of the sighting apparatus shown in FIG. 1.
Figure 7:
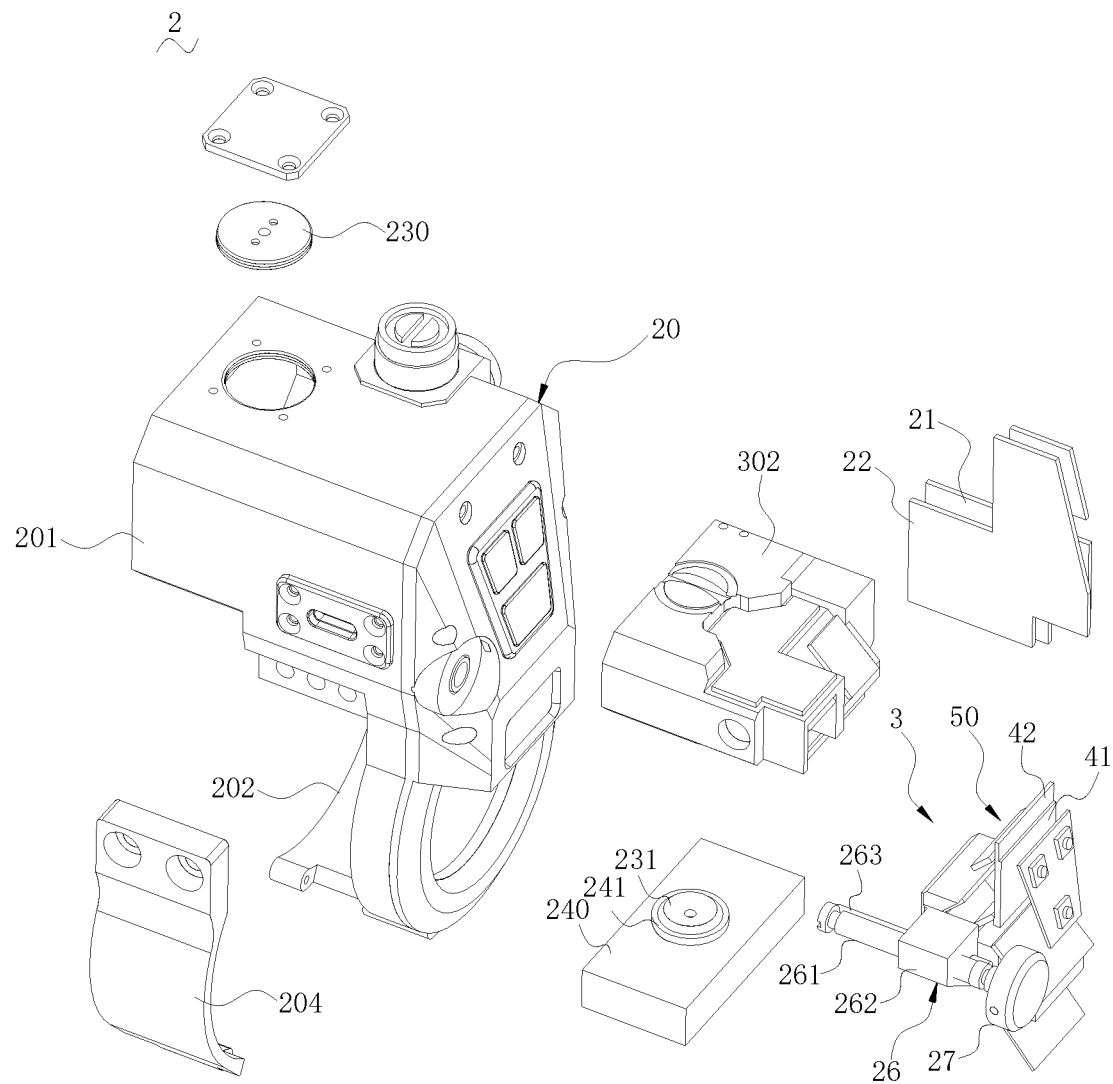
FIG. 7 is an exploded view of the rangefinder shown in FIG. 2.
Figure 8:
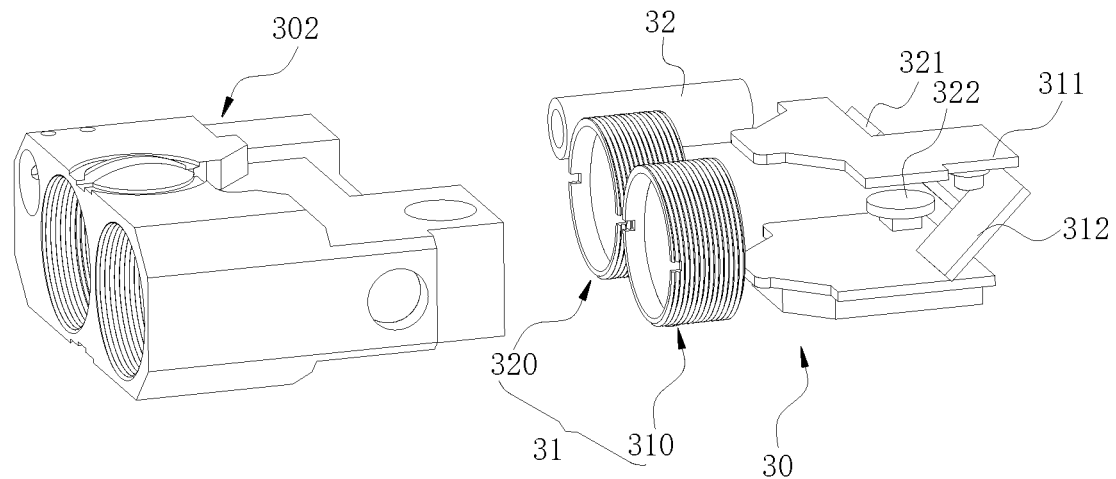
FIG. 8 is an exploded view of partial components in the rangefinder shown in FIG. 7.
Figure 9:
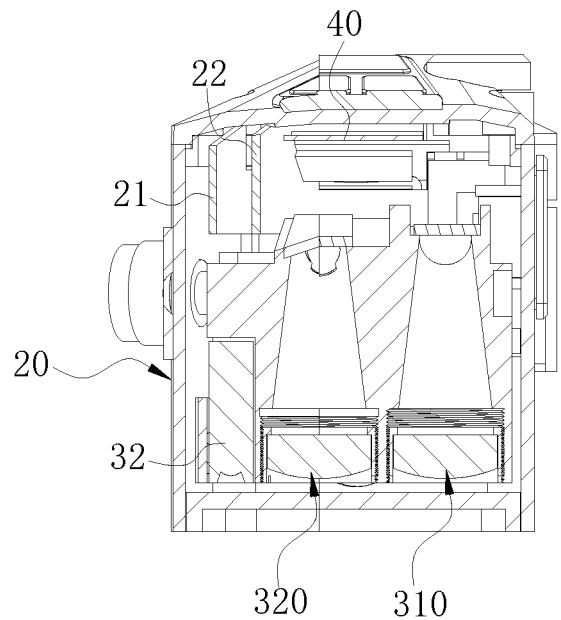
FIG. 9 is a cross-sectional view along line BB in FIG. 4.
Figure 10:
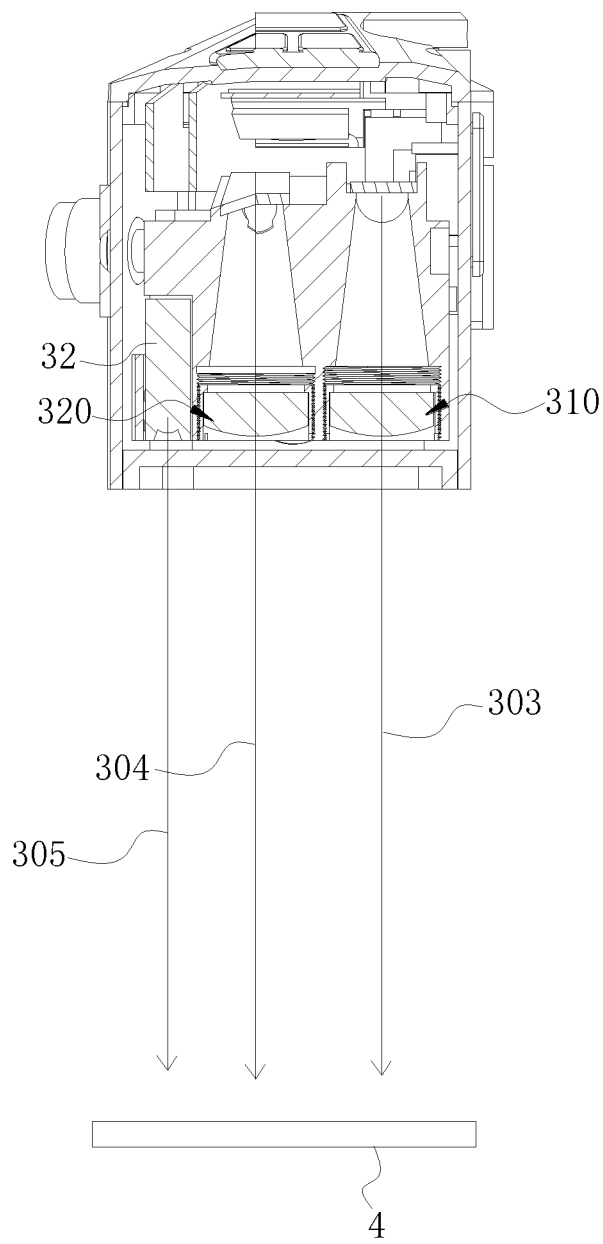
FIG. 10 is a schematic view of an optical path of partial components in the rangefinder shown in FIG. 2.

Further referring to FIGS. 5 to 7, the housing 20 includes a receiving portion 201 and an engaging portion 202 which are connected with each other. When the rangefinder 2 is mounted on the eyepiece tube of the sighting telescope 10, the receiving portion 201 is located directly above the engaging portion 202. The power supply 21, the control module 22, the laser ranging module 30, the display module 40, and optical visibility adjustment system 50 are all located in the receiving portion 201. The engaging portion 202 is detachably connected with the sighting telescope 10. Specifically, the engaging portion 202 is configured as a hollow body with two axial end openings, and the engaging portion 202 is sleeved on the eyepiece tube of the sighting telescope 10. The engaging portion 202 is provided with a supporting leg 204 which can be rotated and opened, and the supporting leg 204 is connected and fixed with the engaging portion 202 through a fastener to lock and fix the engaging portion 202 on the eyepiece tube of the sighting telescope 10. In the embodiment, one end of the supporting leg 204 is connected with a bottom side of the engaging portion 202 through a rotating shaft, and other end of the supporting leg 204 is connected and fixed with a top side of the engaging portion 202 through a screw. When it is necessary to remove the rangefinder 2 from the sighting telescope 10, the screw is screwed out, and the supporting leg 204 is rotated and opened, so that the rangefinder 2 can be removed from the sighting telescope 10. The installation and removal of the rangefinder 2 are convenient. It can be understood that the housing 20 can also be mounted on the eyepiece tube of the sighting telescope 10 through other removable methods such as snap fit, screw fit, etc..

Referring to FIGS. 7 to 10, the laser ranging module 30 includes a laser ranging unit 31. The laser ranging unit 31 is electrically connected with the control module 22 to provide ranging information. The visible laser indicator 32 is electrically connected with the control module 22, which is used to receive natural light and image. The visible laser indicator 32 emits a visible laser beams to a target 4 and forms a ranging and aiming point on the target 4.

In the embodiment, the laser ranging unit 31 includes a laser transmitting unit 310 and a laser receiving unit 320. The laser transmitting unit 310 is used to emit laser beams to the target 4, and the laser receiving unit 320 is used to receive the reflected laser beams. The laser transmitting unit 310 forms a laser transmitting optical path 303, the laser receiving unit 320 forms a laser receiving optical path 304, and the visible laser indicator 32 forms a natural light observing optical path 305. The axes of the laser transmitting optical path 303, the laser receiving optical path 304 and the natural light observing optical path 305 are coaxial, and their axes overlap each other.

Specifically, the laser transmitting unit 310 includes a laser emitter 311 for transmitting laser beams and a laser mirror 312 for reflecting the laser beams. The laser emitter 311 is located above the laser mirror 312, and the laser mirror 312 is arranged obliquely, with its top end tilted towards a rear side of the housing 20. The laser receiving unit 320 includes a laser receiving mirror 321 for converging laser beams diffusely reflected back from the target 4, and a laser receiver 322 for receiving the converged laser beams. The laser receiver 322 converts the received optical signal into an electrical signal.

The control module 22 includes a processing unit and an arithmetic unit. The processing unit records a time period from an emission of a laser beam to a return, and the arithmetic unit calculates a distance of the target 4 based on the time period and a speed of the laser beam. Optionally, upper shell of control module 22 is provided with one or more of the following: an angle sensor for comprehensively measuring an angle of the target 4, a temperature and humidity sensor for measuring temperature and humidity of a surrounding environment, a barometric pressure sensor for measuring an atmospheric pressure of the surrounding environment, a wind speed and direction sensor for measuring a wind speed and direction of the surrounding environment, a satellite positioning system for receiving global positioning data of the target 4, such as latitude and longitude, altitude, and a wireless transmission module. That is the ranging related information of the laser ranging module can include data information such as temperature, humidity, air pressure, wind speed, and direction of the surrounding environment. The arithmetic unit corrects a calculation result based on data information such as temperature, humidity, barometric pressure, wind speed, wind direction and the like of the surrounding environment detected by the ranging imaging module, and thus, the ranging information with high accuracy is displayed on the display module 40, so that the influence of various environmental factors can be overcome and the accuracy can be guaranteed. The wireless transmission module can transmit laser data and sensing data from other sensors to terminal devices. The side of the housing 20 is also provided with an external interface 206, which can but is not limited to using USB or Type-C interfaces. The external interface 206 can be electrically connected to external devices for data transmission.

The visible laser indicator 32 and the laser receiver 322 transmit electrical signals to the control module 22, and the control module 22 processes the obtained electrical signals so that the ranging information and aiming point are displayed simultaneously on the display module 40. The display module 40 then folds and reflects the image into the field of view of the eyepiece through the optical visibility adjustment system 50. Specifically, the display module 40 includes a display driver board 41 and a display screen 42 i mounted on the display driver board 41. The display screen 42 can, but is not limited to, use an OLED display screen, a TFT display screen, an LED display screen, an LCD display screen and a digital tube display screen.

Referring to FIGS. 2, 5, 7, and 10, the rear side of the housing 20 is provided with a back cover 203, which is provided with multiple buttons. One of the buttons is a ranging button 207. After aiming at the target 4, the ranging button 207 is triggered to drive the control module 22 to generate a signal. The laser emitter 311 receives the signal and emits laser beams. The laser beams are reflected by the laser mirror 312 to form a ranging laser that is directed towards the target 4 and reflected to the laser receiving mirror 321. The laser receiving mirror 321 shoots the reflected laser towards the laser receiver 322, The laser receiver 322 converts the received optical signal into an electrical signal, which is transmitted to the control module 22. The control module 22 processes these electrical signals and then transmits the processed data to the display screen 42 to directly display the measurement results. Optionally, electrical signals from the angle sensor, temperature and humidity sensor, temperature and humidity sensor, air pressure sensor, and wind speed and direction sensor are also transmitted to the control module 22 for processing, and the processed results can also be displayed on display screen 42. The back cover 203 is provided with two brightness adjustment buttons 208 which are triggered to adjust the brightness of the image display.

The housing 20 is also provided with an inner housing 302, and at least a portion of the laser ranging unit 31 and the visible laser indicator 32 are accommodated and fixed in the inner housing 302. The inner housing 302 can be movably arranged in the housing 20 through a first adjusting element 23, and the ranging and aiming position of the laser ranging module 30 can be adjusted to coincide with the center of the reticle 12 of the sighting telescope 10 through the first adjusting element 23, that is, the ranging and aiming point of the visible laser indicator 32 can be adjusted to coincide with the center of the reticle 12 of the sighting telescope 10. Specifically, matching spherical pair structures are provided between upper and lower sides and/or left and right sides of the inner housing 302 and the housing 20. The spherical pair structures on the upper and lower sides are arranged coaxially, and the spherical pair structures on the left and right sides are arranged coaxially. The inner housing 302 is rotationally connected to the housing 20 through the spherical pair structure, that is, the inner housing 302 is rotationally installed in the housing 20 in a spherical pair manner. The spherical pair structure can specifically include a ball head and a ball head surface cooperating with each other, that is, a ball head and a ball head surface that are mutually matched between the inner housing 302 and the housing 20, forming the spherical pair structure. In the embodiment, the first adjusting element 23 is provided as a sleeve shaped structure with a ball head surface. The first adjusting element 23 includes a ball head surface 231 located on the top side and bottom side of the receiving portion 201, with the top side ball head surface 231 concave upwards and the bottom side ball head surface 231 concave downwards. The positions of the inner housing 302 corresponding to each ball head surface 231 are respectively provided with protruding ball heads 301, and the ball heads 301 on both sides of the inner housing 302 are matched with the corresponding ball head surfaces 231 on the corresponding side, the ball head surface 231 and the corresponding ball head surface 231 form a spherical pair structure, and the inner housing 302 is rotatably installed in the housing 20 through the coordination of the ball head 301 and the ball head surface 231. The housing 20 is provided with a horizontal adjusting knob 24 and a longitudinal adjusting knob 25. The horizontal adjusting knob 24 can drive the inner housing 302 to rotate horizontally relative to the housing 20, and the longitudinal adjusting knob 25 can drive the inner housing 302 to rotate longitudinally relative to the housing 20. In this way, the inner housing 302 can rotate in the housing 20, so that the ranging and aiming point of the visible laser indicator 32 coincides with the center of the reticle 12 of the sighting telescope 10. That is, when the rangefinder 2 is mounted on the sighting telescope 10 at the first time, the center of the ranging and aiming point and the reticle 12 of the sighting telescope 10 may not coincide, at this time, the adjustment of the coincidence of the ranging and aiming point and the aiming point of the sighting telescope 10 can be completed by turning the horizontal adjusting knob 24 and the longitudinal adjusting knob 25, and then the position of the inner housing 302 in the housing 20 can be locked, and no subsequent adjustment is required. When a corresponding shooting device 3 is used multiple times and it is found that the center of the ranging and aiming point with the reticle 12 do not coincide, the horizontal adjusting knob 24 and the longitudinal adjusting knob 25 can be adjusted again to make the two aiming points coincide.

It can be understood that ball heads can also be coaxially arranged on the left and right sides of the inner housing 302. The position of the ball head corresponding to the housing 20 is provided with a ball head surface, so that the inner housing 302 rotates and is installed in the receiving portion 201 of the housing 20 by means of a spherical pair. Alternatively, ball heads can be respectively arranged on the left and right sides and the upper and lower sides of the inner housing 302. The ball heads on the left and right sides are coaxially arranged, and the ball heads on the upper and lower sides are coaxially arranged. The position of the ball head corresponding to the housing 20 is provided with a ball head surface. In other embodiments, ball head surfaces can also be coaxially set on the left and right sides of the inner housing 302, and ball heads can be provided at the positions corresponding to the ball head surfaces of the housing 20.

Preferably, referring to FIGS. 5 to 7, the housing 20 is provided with a locking member 230. When the ranging and aiming point of the visible laser indicator 32 is adjusted to coincide with the center of the reticle 12 of the sighting telescope 10 through the horizontal adjusting knob 24 and the longitudinal adjusting knob 25, the inner housing 302 can be locked and fixed in the housing 20 through the locking member 230. In this embodiment, the top surface of the housing 20 is provided with a threaded hole, and the locking element 230 is threaded to the threaded hole. The bottom surface of the locking element 230 forms the ball head surface 231 on the top side of the first adjusting element 23. When the locking element 230 is rotated out, the inner housing 302 is in a rotatable state. When the locking element 230 is rotated in to a certain distance, the inner housing 302 is locked. At this time, the inner housing 302 is fixed relative to the housing 20, and the inner housing 302 is in a non-rotatable state. A fixed seat 240 is provided inside the housing 20, and a ball head seat 241 is mounted on the fixed seat 240. A top surface of the ball head seat 241 is concave to form the ball head surface 231 on the bottom side of the first adjusting element 23, and the ball head surfaces 231 on the upper and lower sides are arranged coaxially in a vertical direction.

Referring to FIGS. 2 and 5 to 7, the display module 40 and the optical visibility adjustment system 50 constitute a ranging data display system 3. Part of the optical visibility adjustment system 50 can be movably arranged inside the housing 20 through a second adjusting element 26. After the adjustment of the second adjusting element 26, the optical visibility of the ranging data display system 3 can be adjusted to be the same as the optical visibility of the sighting telescope 10. In this embodiment, the optical visibility adjustment system 50 includes multiple mirrors. Partial the mirrors can be movably set inside the housing 20 through the second adjusting element 26, so that after adjusting the second adjusting element 26, the optical visibility of the ranging data display system 3 can be adjusted to be the same as that of the sighting telescope 10. That is, after adjusting the second adjusting element 26, the size value of the total optical path of the optical visibility adjustment system 50 changes, thus achieving visibility adjustment. After visibility adjustment, the optical visibility of the ranging data display system 3 can be equivalent to the optical visibility of the original sighting telescope 10, and the user can observe the ranging value while using the original sighting telescope 10 normally.

The housing 20 is provided with a visibility adjusting knob 27, which is connected to the second adjusting element 26. By rotating the visibility adjusting knob 27, the second adjusting element 26 can be driven to move relative to the housing 20, thus achieving visibility adjustment.

Specifically, the second adjusting element 26 includes a screw 261 and a visibility adjusting seat 262 located within the housing 20. The screw 261 is rotationally connected to the housing 20, and the two axial ends of the screw 261 can be rotationally connected to the housing 20 through bearings. The visibility adjusting seat 262 slidably fits with the housing 20. The visibility adjusting seat 262 is screwed and installed on the screw 261, and the visibility adjusting knob 27 is connected to one end of the screw 261. Some mirrors in the optical visual adjustment system 50 are fixed on the visibility adjusting seat 262. When the visibility adjusting knob 27 is turned, the screw 261 rotates accordingly, and the screw 261 drives the visibility adjusting seat 262 to move forward and backward along the housing 20. The housing 20 can be provided with a sliding rod or sliding rail, and the visibility adjusting seat 262 slides in conjunction with the sliding rod or sliding rail. The axis direction of the sliding rod or sliding rail is parallel to the front and rear directions of the housing 20, so that the visibility adjusting seat 262 is slidably assembled inside the housing 20 through the sliding rod or sliding rail. In the embodiment, at least one sliding rod 263 is provided inside the housing 20, and the visibility adjusting seat 262 is in sliding fit with each sliding rod 263.

Specifically, the display module 40 is located on the rear side of the housing 20. The optical visibility adjustment system 50 includes a first mirror 51, a second mirror 52, a third mirror 53, a fourth mirror 54, a fifth mirror 55, and a sixth mirror 56. The first mirror 51 and the second mirror 52 are arranged in parallel intervals, and the second mirror 52 is located directly above the first mirror 51, and the mirror surfaces of the two are arranged relative to each other. The top of the first mirror 51 is tilted towards the front side of the housing 20, and the mirror surface of the first mirror 51 is arranged towards the rear side of the housing 20. The mirror surfaces of the third mirror 53 and the fourth mirror 54 are adjacent and arranged at an angle of 90 degrees. The fourth mirror 54 is located above the third mirror 53, and the third mirror 53 and the second mirror 52 are arranged in parallel intervals. The fifth mirror 55 is arranged in parallel with the sixth mirror 56 at intervals, the sixth mirror 56 is located directly above the fifth mirror 55, the mirror surface of the sixth mirror 56 is arranged towards the light-emitting surface of the display module 40, the top of the sixth mirror 56 is inclined towards the display module 40, and the fifth mirror 55 is arranged in parallel with the fourth mirror 54 at intervals. The light emitted by the display module 40 is first reflected by the sixth mirror 56, then sequentially reflected by the fifth mirror 55, the fourth mirror 54, the third mirror 53, and the second mirror 52, and finally reflected by the first mirror 51 into the field of view of the eyepiece 11. The tilt angle of the first mirror 51 can be set according to the field of view area of the eyepiece 11 of the sighting telescope 10, so that the light reflected from the first mirror 51 falls into the field of view of the eyepiece 11. The bottom side of the back cover 203 of the housing 20 is provided with a light outlet 205, and a lens is vertically arranged at the light outlet 205, and the first mirror 51 enters the field of view of the eyepiece after being emitted from the lens.

It can be understood that the optical visibility adjustment system 50 can also use other numbers of mirrors, and the placement position of the mirrors can also be adjusted accordingly, as long as these mirrors meet the reflection imaging conditions and can fold and reflect the light emitted by the display screen 42 into the field of view of the eyepiece.

Preferably, the optical visibility adjustment system 50 also includes multiple convex lenses. The housing 20 is provided with multiple convex lenses on the optical path of the optical visibility adjustment system 50. In the embodiment, the housing 20 is provided with multiple convex lenses on the optical path near the light-emitting side of the optical visibility adjustment system 50. Specifically, a first convex lens 57 is provided between the first mirror 51 and the second mirror 52, and a second convex lens 58 is provided between the second mirror 52 and the third mirror 53. The setting of convex lenses can concentrate light and enlarge images, shorten the optical path for visual adjustment, and make visual adjustment more sensitive.

The shooting auxiliary device provided in the embodiment of the present application includes the sighting apparatus 1 recorded in the above embodiment.

The above is only preferred embodiments of the present application, and is not intended to limit the present application. Any simple change or equivalent replacement of the technical solution that can be easily obtained by any person familiar with the technical field within the technical scope disclosed by the application falls within the protection scope of the application.

The invention claimed is:

1. A rangefinder, comprising:
a housing detachably mounted and fixed on a sighting telescope;
a power supply, a control module, a laser ranging module, a visible laser indicator, a display module and an optical visibility adjustment system which are accommodated in the housing, wherein the power supply is electrically connected with the control module, the laser ranging module and the display module are electrically connected with the control module, an optical path of the laser ranging module is coaxial with an optical path of the visible laser indicator, the visible laser indicator is used for a position indication when a ranging and aiming position of the laser ranging module coincides with a center of a reticle of the sighting telescope, an image shown by the display module is adjusted by the optical visibility adjustment system to meet observation habits of different users and make a ranging data visible in an eyepiece field of the sighting telescope, the image displayed by the display module shows ranging and related information of the laser ranging module;
wherein the display module and the optical visibility adjustment system constitute a ranging data display system, part of the optical visibility adjustment system is movably arranged inside the housing through an adjusting element, so that an optical visibility of the ranging data display system is adjusted to be the same as an optical visibility of the sighting telescope;
wherein the optical visibility adjustment system comprises multiple mirrors and multiple convex lenses, part of the mirrors is movably set inside the housing through the adjusting element, the housing is provided with a visibility adjusting knob which is connected to the adjusting element to drive the adjusting element to move relative to the housing; and
wherein the adjusting element comprises a screw and a visibility adjusting seat located within the housing, the screw is rotationally connected to the housing, the visibility adjusting seat slidably fits with the housing, the visibility adjusting seat is screwed and installed on the screw, and the visibility adjusting knob is connected to one end of the screw, some mirrors in the optical visibility adjustment system are fixed on the visibility adjusting seat, when the visibility adjusting knob is turned, the screw drives the visibility adjusting seat to move forward and backward along the housing.

2. The rangefinder according to claim 1, wherein the laser ranging module comprises a laser ranging unit which is electrically connected with the control module to provide ranging information, the visible laser indicator is electrically connected with the control module, and the visible laser indicator emits a visible laser beam to a target and forms a ranging and aiming point on the target.

3. The rangefinder according to claim 2, wherein at least a portion of the laser ranging unit and the visible laser indicator are accommodated and fixed in an inner housing, and the inner housing is movably arranged in the housing through a another adjusting element to adjust the ranging and aiming point of the laser ranging module to coincide with the center of the reticle of the sighting telescope through the another adjusting element.

4. The rangefinder according to claim 3, wherein the housing is provided with a horizontal adjusting knob which drives the inner housing to rotate horizontally relative to the housing and a longitudinal adjusting knob which drives the inner housing to rotate longitudinally relative to the housing.

5. The rangefinder according to claim 3, wherein upper and lower sides and/or left and right sides of the inner housing are provided with matching spherical pair structures matching with the housing, and the inner housing is rotatably connected with the housing through the spherical pair structures.

6. The rangefinder according to claim 5, wherein the left and right sides of the inner housing are provided with coaxial ball heads, and positions of the housing corresponding to the ball heads are provided with ball head surfaces, and the ball heads and the ball head surfaces cooperate to form the spherical pair structures.

7. The rangefinder according to claim 5, wherein the upper and lower sides of the inner housing are provided with coaxial ball heads, and positions of the housing corresponding to the ball heads are provided with ball head surfaces, and the ball heads and the ball head surfaces cooperate to form the spherical pair structures.

8. The rangefinder according to claim 5, wherein the housing is provided with a locking member, and the inner housing is capable of being locked and fixed in the housing through the locking member.

9. The rangefinder according to claim 8, wherein the housing is provided with a threaded hole, and the locking element is threaded to the threaded hole, when the locking member is screwed into a predetermined position inside the housing to contact the inner housing, so that the inner housing is fixed relative to the housing.

10. The rangefinder according to claim 1, wherein the multiple convex lenses are provided in the housing and near a light-emitting side of the optical visibility adjustment system.

11. The rangefinder according to claim 10, wherein the display module is located on a rear side of the housing, the multiple mirrors comprise a first mirror, a second mirror, a third mirror, a fourth mirror, a fifth mirror, and a sixth mirror, the first mirror is arranged in parallel with the second mirror at intervals, the third mirror and the fourth mirror are fixed at an angle on the visibility adjusting seat, the second mirror is arranged in parallel with the third mirror at intervals, the fourth mirror is arranged in parallel with the fifth mirror at intervals, and the fifth mirror is arranged in parallel with the sixth mirror at intervals; the sixth mirror is located on a front side of the display module and its mirror surface is facing the display module, a top end of the sixth mirror is tilted towards the display module, and the fifth mirror is located directly below the sixth mirror, a top end of the first mirror is tilted towards a front side of the housing and its mirror surface is facing the rear side of the housing.

12. The rangefinder according to claim 11, wherein the multiple convex lenses comprise a first convex lens which is provided between the first mirror and the second mirror, and a second convex lens which is provided between the second mirror and the third mirror.

13. The rangefinder according to claim 1, wherein the housing is provided with a sliding rod or sliding rail, and the visibility adjusting seat slides in conjunction with the sliding rod or sliding rail.

14. The rangefinder according to claim 1, wherein the housing comprises a receiving portion and an engaging portion which are connected with each other, the power supply, the control module, the laser ranging module, the visible laser indicator, the display module, and the optical visibility adjustment system are located in the receiving portion, and the engaging portion is detachably connected with the sighting telescope.

15. The rangefinder according to claim 14, wherein the engaging portion is configured as a hollow body with two axial end openings, the engaging portion is provided with a supporting leg which is capable of being rotated and opened, one end of the supporting leg is rotatably connected with the engaging portion, and the other end of the supporting leg is connected and fixed with the engaging portion through a fastener to lock and fix the engaging portion on the sighting telescope.

16. A sighting apparatus comprising a sighting telescope and a rangefinder connected with the sighting telescope, wherein the rangefinder is the rangefinder according to claim 1.

17. A shooting auxiliary device comprising the sighting apparatus according to claim 16.

* * * * *